Figure 1:
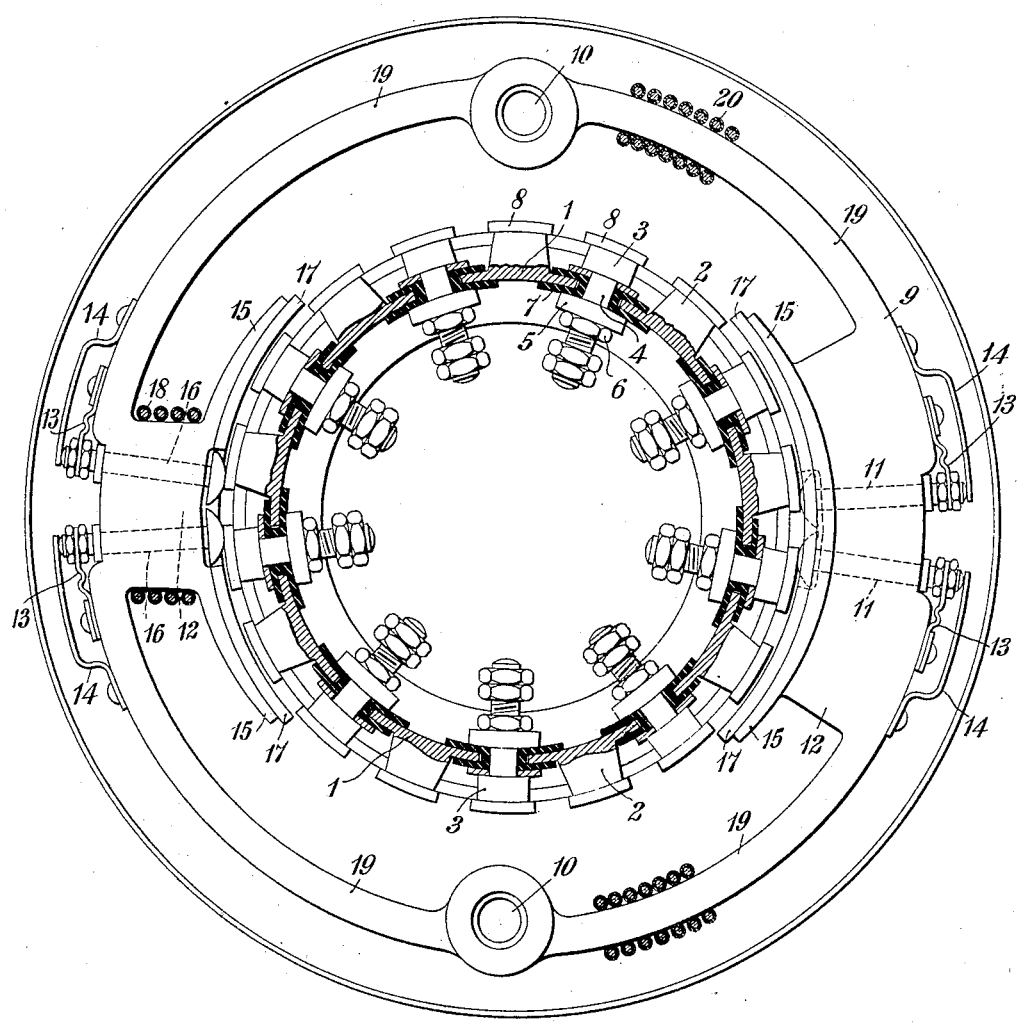

No. 876,970.

W. F. JONES.
ELECTRIC SWITCH.
APPLICATION FILED JULY 13, 1907.

PATENTED JAN. 21, 1908.

5 SHEETS—SHEET 1.

WITNESSES:
C. L. Belcher
Otto S. Schairer

INVENTOR
Walter F. Jones
BY
Wesley G. Carr
ATTORNEY

No. 876,970. PATENTED JAN. 21, 1908.
W. F. JONES.
ELECTRIC SWITCH.
APPLICATION FILED JULY 13, 1907.

5 SHEETS—SHEET 2.

WITNESSES:
C. L. Belcher
Otto S. Schairer

INVENTOR
Walter F. Jones
BY
Sidney G. Carr
ATTORNEY

No. 876,970.
W. F. JONES.
ELECTRIC SWITCH.
APPLICATION FILED JULY 13, 1907.
PATENTED JAN. 21, 1908.
5 SHEETS—SHEET 3.
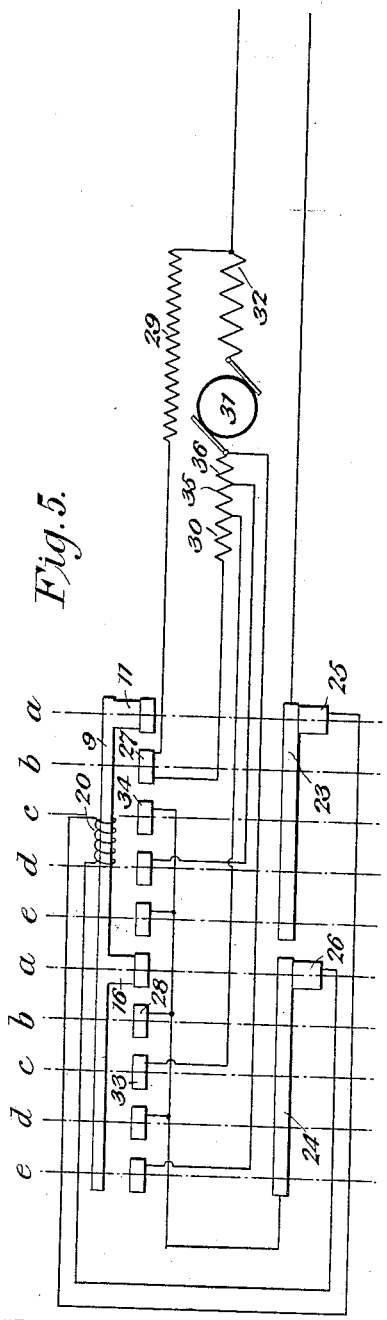
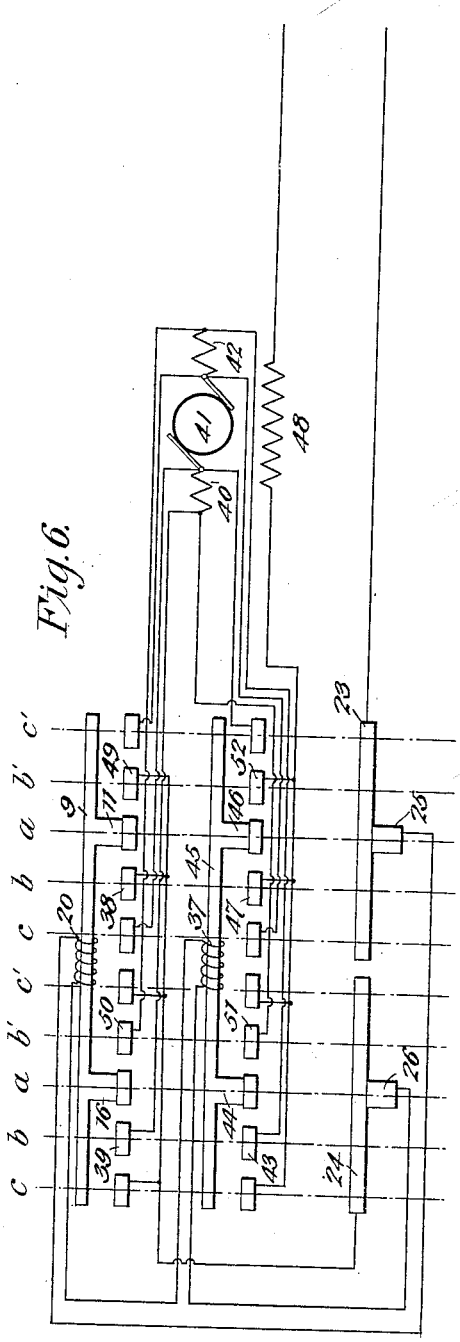
WITNESSES:
C. L. Belcher
Otto S. Schairer
INVENTOR
Walter F. Jones
BY
Wesley G. Carr
ATTORNEY No. 876,970.
PATENTED JAN. 21, 1908.
W. F. JONES.
ELECTRIC SWITCH.
APPLICATION FILED JULY 13, 1907.
5 SHEETS—SHEET 4.
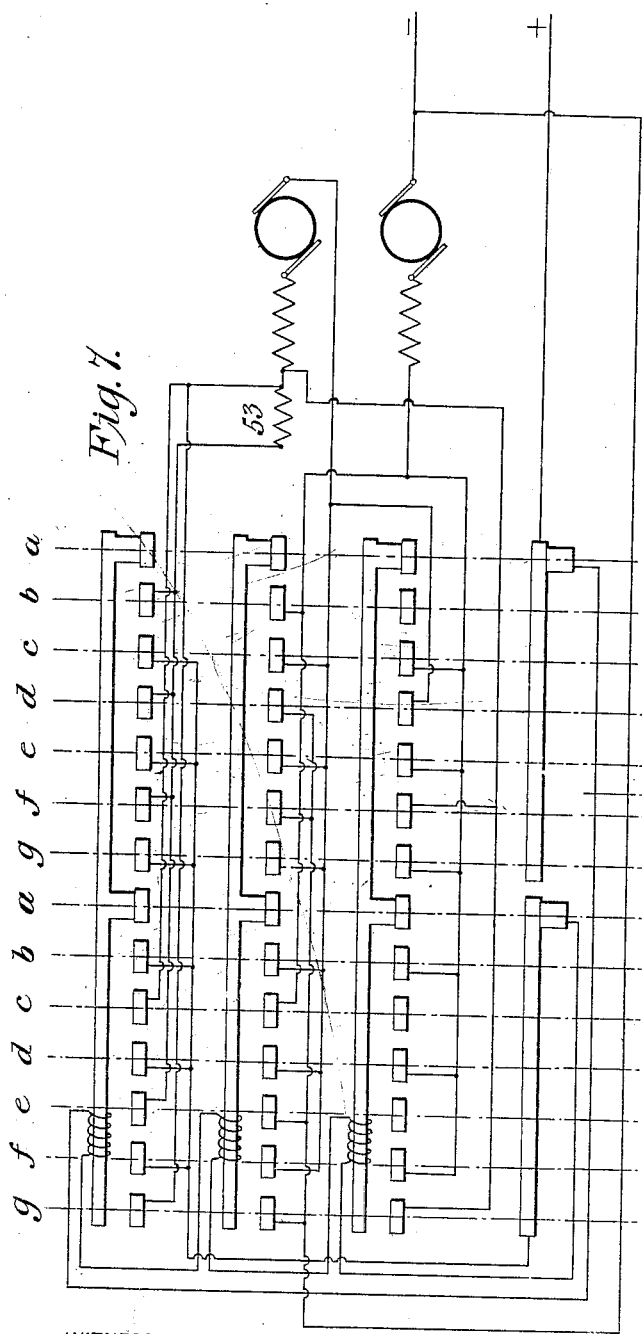
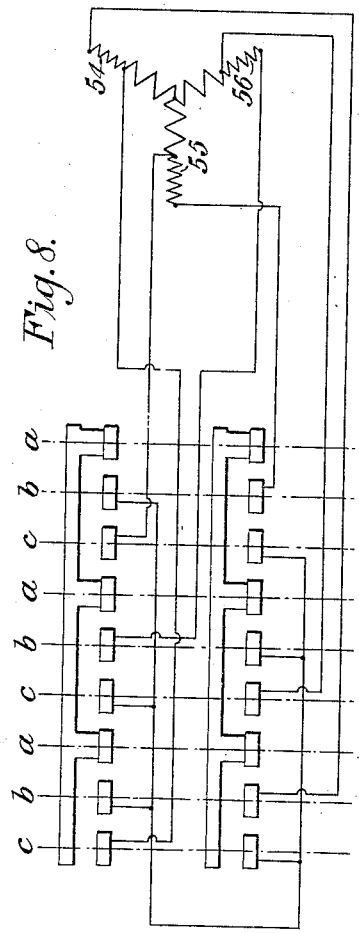
WITNESSES:
C. L. Belcher
Otto S. Schairer
INVENTOR
Walter F. Jones
BY
Wesley G. Carr
ATTORNEY

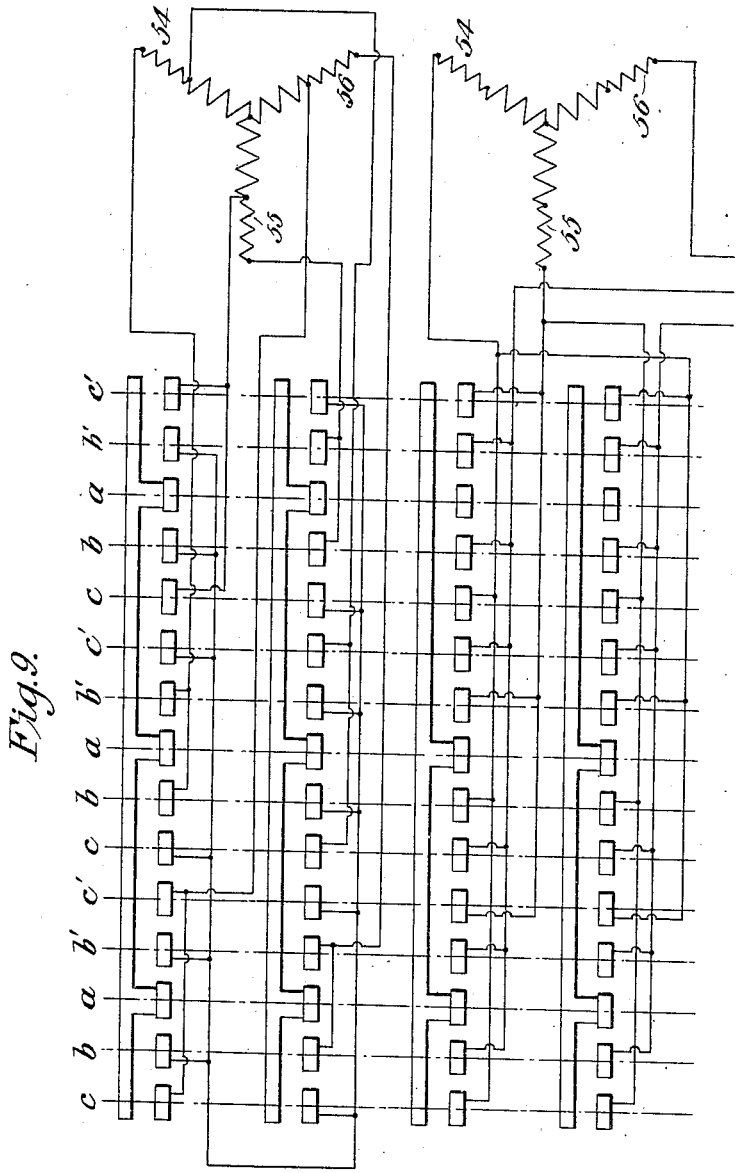

UNITED STATES PATENT OFFICE.

WALTER F. JONES, OF ECCLES, NEAR MANCHESTER, ENGLAND, ASSIGNOR TO WESTINGHOUSE ELECTRIC & MANUFACTURING COMPANY, A CORPORATION OF PENNSYLVANIA.

ELECTRIC SWITCH.

No. 876,970.

Specification of Letters Patent.

Patented Jan. 21, 1908.

Application filed July 13, 1907. Serial No. 383,657.

*To all whom it may concern:*

Be it known that I, WALTER F. JONES, a subject of the King of Great Britain, and a resident of Eccles, near Manchester, England, have invented a new and useful Improvement in Electric Switches, of which the following is a specification.

My invention relates to switches for controlling electric circuits, such as controllers, starting and regulating switches and the like to be used for varying the resistance of a circuit, making or breaking its connections either singly or in numbers, or of making changes in the grouping of its connections.

My invention consists in the special construction of a unit contact cylinder and in such combination of the units that a small number of principal parts may be utilized to form many types of apparatus, the same parts being suitable for constructing drum type controllers and starting or regulating switches, of either single direction or reversing type, for use in connection with either single or multi-phase circuits or with either continuous or alternating currents of any amplitude or voltage.

In the cylindrical or controller type of switch now generally in use, it is customary to have one segment through which the current enters, and another through which it departs at each of the places where the circuit is made or broken; also, where resistances are to be cut in or out, a segment is generally provided for each one or two portions of such resistances. According to the present invention, however, the controller is so constructed that the current enters and departs from the same segment, and a considerable number of resistance sections can be controlled from the same segment and a length of break secured that is equal to or greater than that which has hitherto been the practice.

The unit contact ring of my invention consists of a metal ring or cylinder provided with projections or teeth approximately equally spaced around its periphery. In the spaces between these projections are arranged contacts suitably insulated from the ring, the extremities of the teeth and of these insulated contacts forming a circular path for contact blocks or brushes which are carried by the movable member of the apparatus, and which serve to connect the teeth and successive insulated contacts together. The contact ring is connected to one conductor of the supply circuit, and the insulated contacts are connected to the other conductor of the supply circuit and to the elements of the circuit to be controlled in accordance with the method of regulation which it is desired to practice.

The invention is illustrated in the accompanying drawings, of which

Figure 2:
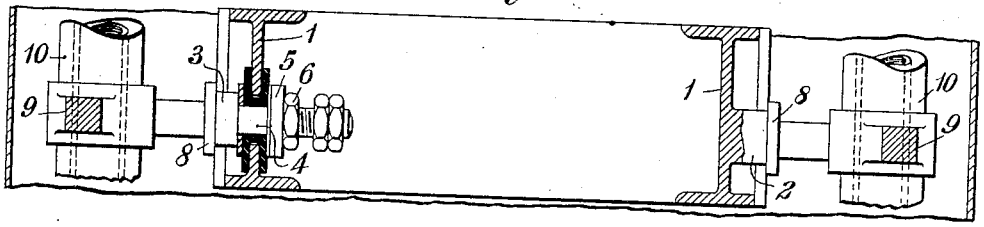
Figure 3:
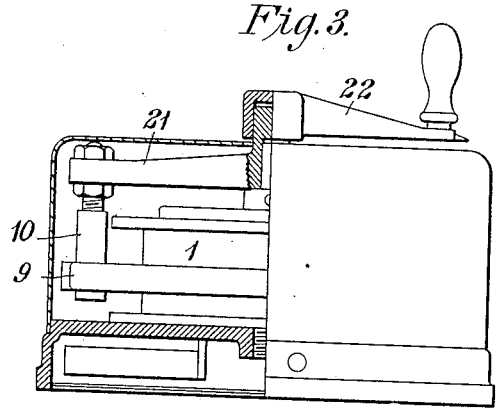
Figure 4:
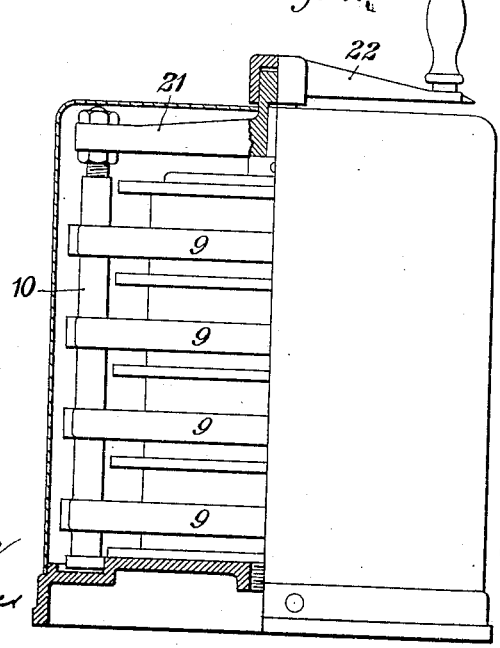

Figure 1 is a plan view, partly in section, of a single unit contact ring constructed in accordance with my invention. Fig. 2 is a view, in sectional elevation, of the unit contact ring of Fig. 1. Fig. 3 shows, in elevation and partly in section, the unit switch contact ring of Figs. 1 and 2 with its inclosing casing and operating handle. Fig. 4 is a view, similar to Fig. 3, showing a controller having four unit contact rings. The remaining figures are diagrams of connections, Fig. 5 showing the connections for using a single unit contact ring as a starting switch for a direct current motor, and Fig. 6 being a similar diagram of connections for a double unit contact ring controller for operating a direct current motor in either direction of rotation. Fig. 7 is a diagram of connections for a triple unit contact ring controller for series-parallel control of two direct current series motors. Fig. 8 is a diagram of connections for a double unit contact ring controller forming a starting switch for a three-phase alternating current motor, and Fig. 9 is a diagram of connections for a quadruple unit contact ring controller for starting and reversing a three-phase alternating current motor.

Referring now to Figs. 1 and 2, a metal ring is indicated at 1 having projections or teeth 2 cast upon it or fixed thereto in any suitable way. A number of insulated contacts 3 are located in the spaces between the projections 2, these contacts being provided with shanks 4 extending through the ring 1 and bolted thereto by means of clamping plates 5 and nuts 6. Insulating washers 7 serve to insulate the contacts 3 from the ring 1. The ends of projections 2 of the ring 1 and the contacts 3 are provided with copper contact segments 8. Surrounding the fixed ring 1 is a movable element or outer ring 9 carried by supports 10 which serve to rotate the outer rings 9 relatively to the fixed ring 1. The ring 9 is provided with one or more sets of brushes or contact fingers arranged diametrically opposite to one another. As shown in Fig. 1, the brushes consist of four bolts 11 and 16 sliding loosely in blocks 12 forming part of the movable ring 9, the outer end of each bolt being connected electrically to the ring by means of flexible conductors 13, and the bolts being caused to press upon the contact surfaces of the fixed ring 1 by means of springs 14. In addition to carrying the brushes 11 and 16, the movable ring may also constitute a blow-out magnet for the controller, as shown in the drawings, in which case the rings 1 and 9 are of magnetic material, and the blocks 12 of the movable rings are formed with pole tips 15 extending on each side of the brushes 11 and 16. The pole tips 15 are protected from arcing by means of shields of suitable material 17 on either side of the brushes. The energizing coil for operating the blow-out magnet may be wound either, as shown at 18, on the blocks 12 of the movable ring, or it may surround the yoke portions 19 of the said ring, as shown at 20. When the controller is intended for use with alternating currents, the rings 1 and 9 are composed of laminations in the usual manner.

As shown in Fig. 3, the supports 10 carrying the movable ring 9 are connected to a supporting frame 21 carried in bearings and fixed to the operating handle 22 in any well known way.

It will, of course, be understood that the unit contact ring may be employed without any blow-out magent attachment, in which case the pole pieces 15 will be unnecessary. In cases, however, in which such a device is used, a further contact in the controller will be necessary, in order to convey current for the blow-out magnet to the movable element of the controller, consisting, for instance, of slip rings or plates 23 and 24, and brushes 25 and 26, as shown diagrammatically in Figs. 5, 6 and 7. Evidently, a greater number of blow-out magnet pole tips or contact points may be employed, if desired.

Referring now to the remaining figures of the drawings which show diagrams of connections for various uses to which a controller comprising one or more unit contact rings of the kind described may be applied, Fig. 5 shows the connections for a single unit contact ring used as a starting switch for a direct current compound wound motor. By means of the operating handle of the controller, the movable ring, with its attached brushes, may be brought successively into the positions $a, b, c, d, e$. The $a$ position is the "off" position of the controller. In the $b$ position, the brush 11 is in contact with the insulated contact 27 while the brush 16 is in contact with the projection 28 of the fixed ring 1, and a circuit is completed from the positive terminal of the supply circuit through the slip ring 23, blow-out magnet coil 20, slip ring 24, contact ring projection 28 and movable ring 9 to the insulated contact 27. At this point the current divides, part of it traversing the shunt field winding 29, and the remainder going through the resistance 30, 35, 36, the armature 31 of the motor, and the series field magnet winding 32 to the other terminal of the supply circuit. On moving the controller to the position $c$, the brush 16 comes in contact with the insulated contact 33 and the other brush 11 makes contact with the projection 34 of the fixed ring 1, so that the portion 30 of the resistance is now cut out. A further movement of the controller to the position $d$ cuts out a further portion 35 of the resistance in a like manner, and movement of the controller to the final position $e$ cuts out the remaining section 36 of the resistance, leaving the armature and series field winding directly connected in series across the supply circuit. The shunt field winding 29 in positions $c, d$ and $e$ is supplied with current through the contact 27 and more or less of the resistance 30, 35, 36.

Fig. 6 is a diagram of connections for a controller having two unit contact rings arranged to operate a series motor in either direction of rotation. As before, when the controller is in the position $a$, no circuit is completed. Upon moving the controller to the position $b$, a circuit is completed from one terminal of the supply conductor through the slip ring 23, blow-out magnet coils 20 and 37, slip ring 24, projection 38 of the fixed ring 1, brush 11, movable ring 9, brush 16, contact 39, resistance 40, armature 41, resistance 42, contact 43, brush 44, movable ring 45, brush 46, projection 47 of the second fixed ring and series field winding 48, to the other terminal of the supply circuit. A further movement of the controller to the position $c$ cuts out the resistances 40 and 42 so that the motor will now operate at full speed in one direction of rotation. On moving the controller in the opposite direction from the "off" position $a$, namely, to the position $b'$, a circuit is completed from the positive terminal of the supply circuit through slip ring 23, blow-out magnet coils 20 and 37, slip ring 24, projection 49 of fixed ring 1, brush 11, movable ring 9, brush 16, contact 50, resistance 42, armature 41, resistance 40, contact 51, brush 44, movable ring 45, brush 46, projection 52 and series field winding 48 to the other terminal of the supply circuit. Current now traverses the armature of the motor in the opposite direction to that obtained in the position b, and the motor consequently reverses its direction of rotation. A further movement of the controller to the position c' cuts out the resistances 40 and 42, thus causing the motor to operate at full speed.

From what has been said with reference to Figs. 5 and 6, the operation of the controllers shown in the remaining Figs. 7, 8 and 9 will readily be understood since these show well-known methods of connection for the various stages of operation of two direct current series motors and a three-phase motor, respectively.

Fig. 7 shows a controller having three unit contact rings for effecting series-parallel control of two direct current motors, and in the b position of the controller, the motors are connected in series with one another and with a resistance 51. In the c position, the resistance 51 is cut out, and in the positions d and e, one of the motors is cut out of circuit, the two being connected in parallel and in series with the resistance in the f position. In the final position g, the resistance is cut out and the motors are then connected in parallel with one another directly across the supply circuit.

In Fig. 8, a double unit contact ring controller is used for the purpose of cutting out the resistances connected in the three arms of a star-connected secondary winding for an induction motor. This controller has only two operative positions, in the b position of which the resistances 52, 53 and 54 are in series with the windings of the motor while in the c position these resistances are cut out.

Fig. 9 shows a quadruple unit contact ring controller forming a starting and reversing switch for a three-phase alternating current motor. The connections are similar to those of Fig. 8, but two additional contact rings are added for reversing the connections of the primary winding of the motor to the supply circuit, in order to obtain a reversal in the direction of rotation.

It will, of course, be understood that where more than a single contact ring is employed the movable rings of the several units are mounted on the same shaft and operate together by means of the operating handle. The rings must also be insulated from one another and the same applies to the movable rings and their supports.

The cylinder or cylinders may be supported and protected in any suitable manner, and the apparatus may be operated automatically by any usual means. A plurality of units may also be arranged in parallel when greater current capacity is required, or in series in cases where a high voltage makes this desirable. In the latter case, by advancing the angle at which the contacts stand from one contact ring relative to another, any number of intermediate breaks cutting in or out resistances and the like may be arranged.

It will also be understood that the insulated contacts and projections of the switch contact ring may be arranged on the interior of the ring or cylinder, if desired, and that other variations from the forms herein shown and described may be made without departing from the spirit and scope of the invention.

I claim as my invention:

1. A switch for electric circuits comprising a ring or cylinder of conducting material having projecting teeth around its periphery between which are arranged insulated contacts carried by the said ring, the extremities of the said teeth and insulated contacts forming a contact path for relatively movable brushes which serve to make successive connection between the projections of the ring and one or more of the insulated contacts, substantially as described.

2. A controller for electric circuits comprising a ring of conducting magnetic material having projecting teeth around its periphery between which are arranged insulated contacts connected to the elements of the circuit to be controlled, and a relatively movable ring or frame provided with contact brushes and blow-out magnet pole tips adjacent thereto, substantially as described.

3. In a switch device, the combination of two relatively movable members one of which has contact fingers or brushes and the other of which comprises two sets of alternately disposed contact segments, the segments of one set being all electrically connected together and those of the other set being insulated from the first named set and from each other.

4. The combination of two relatively movable switch members one of which has a plurality of contact fingers or brushes and the other of which comprises a conducting ring having a plurality of uninsulated contact projections and a plurality of contact projections that alternate in position with the uninsulated projections and are clamped to the ring and insulated therefrom.

5. The combination of two relatively rotatable switch members one of which has a plurality of sets of contact fingers or brushes and the other of which comprises a plurality of conducting rings severally provided with a plurality of uninsulated contact projections and a plurality of alternately disposed and individually insulated contact projections.

6. In a controller, the combination with a plurality of sets of contact fingers and a supporting frame therefor, of a plurality of conducting rings each of which has two sets of contact projections adapted to engage one of the sets of contact fingers, one of said sets of projections being insulated and the other set uninsulated from said ring.

7. A controller comprising a conducting ring having a set of integral contact projections and an alternating set of insulated contact projections and a frame having contact fingers to engage said contact projections, said frame and ring being relatively rotatable.

In testimony whereof, I have hereunto subscribed my name this 24th day of June, 1907.

WALTER F. JONES.

Witnesses:
 JNO. S. PICK,
 G. W. PINNER.